United States Patent
Hasshi et al.

[11] Patent Number: 6,039,386
[45] Date of Patent: Mar. 21, 2000

[54] FLOOR STRUCTURE OF A VEHICLE

[75] Inventors: Suehiro Hasshi; Toshiki Takahashi, both of Wako, Japan

[73] Assignee: Honda Giken Kogyo Kabushiki Kaisha, Tokyo, Japan

[21] Appl. No.: 09/045,122

[22] Filed: Mar. 20, 1998

[30] Foreign Application Priority Data

Mar. 24, 1997 [JP] Japan ..................................... 9-088960
Mar. 24, 1997 [JP] Japan ..................................... 9-088961

[51] Int. Cl.⁷ ...................................................... B60J 7/00
[52] U.S. Cl. .................... 296/185; 296/193; 296/203.01; 296/205
[58] Field of Search ..................................... 296/193, 185, 296/209, 204, 205, 203.04, 203.01

[56] References Cited

U.S. PATENT DOCUMENTS

| | | | |
|---|---|---|---|
| 2,431,524 | 11/1947 | Ulrich et al. | 296/204 |
| 2,613,986 | 10/1952 | Heyl, Jr. | 296/204 |
| 2,899,236 | 8/1959 | Hodkin | 296/204 |
| 3,617,087 | 11/1971 | Hiramatsu | 296/28 |
| 4,569,551 | 2/1986 | Rauser et al. | 296/204 |
| 5,806,918 | 9/1998 | Kanazawa | 296/204 |

FOREIGN PATENT DOCUMENTS 409066864A  3/1997  Japan ..................................... 296/240

*Primary Examiner*—D. Glenn Dayoan
*Assistant Examiner*—Lori Coletta
*Attorney, Agent, or Firm*—Armstrong, Westerman Hattori, McLeland & Naughton

[57] ABSTRACT

In a floor structure of a vehicle comprising: left and right side sills; a substantially flat floor panel extending between the left and right side sills; and a cross member for connecting the left and right side sills, the cross member comprises: left and right upper members which extend inwardly from the left and right side sills, respectively, and attached to a top surface of the floor panel with their opposing inward ends spaced from each other; and a lower member extending laterally across a part of a lateral length of the vehicle and attached to an under surface of the floor panel. In the above floor structure, an open space formed beside the lower member can accommodate external piping under the floor panel, and the floor surface can be substantially flat by placing front seats over the upper members. Thus, a floor structure is achieved in which the floor surface is substantially flat and the floor is placed at a lower position. The upper and lower members connected via the floor panel can ensure sufficient rigidity of the floor structure.

6 Claims, 3 Drawing Sheets

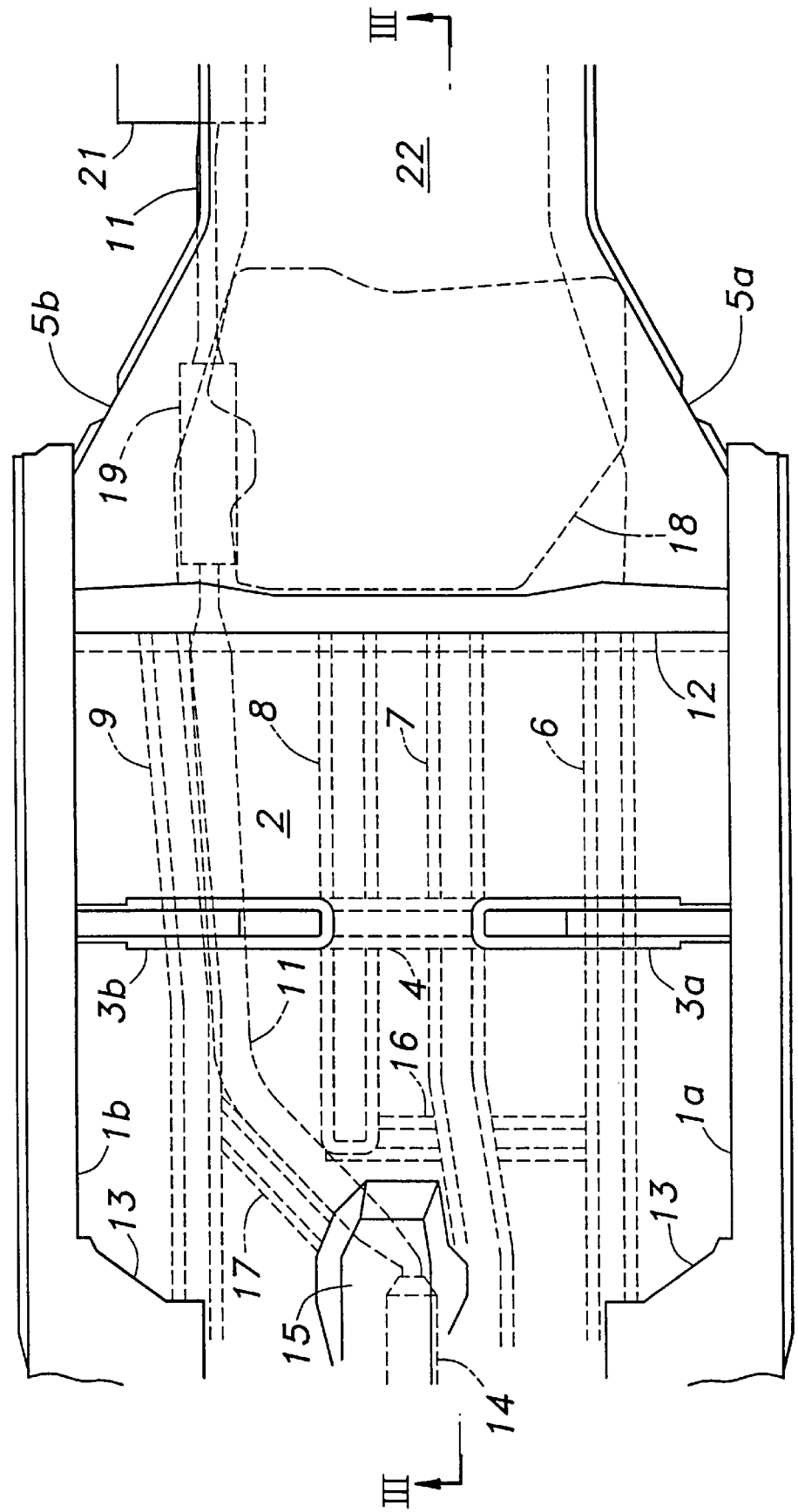

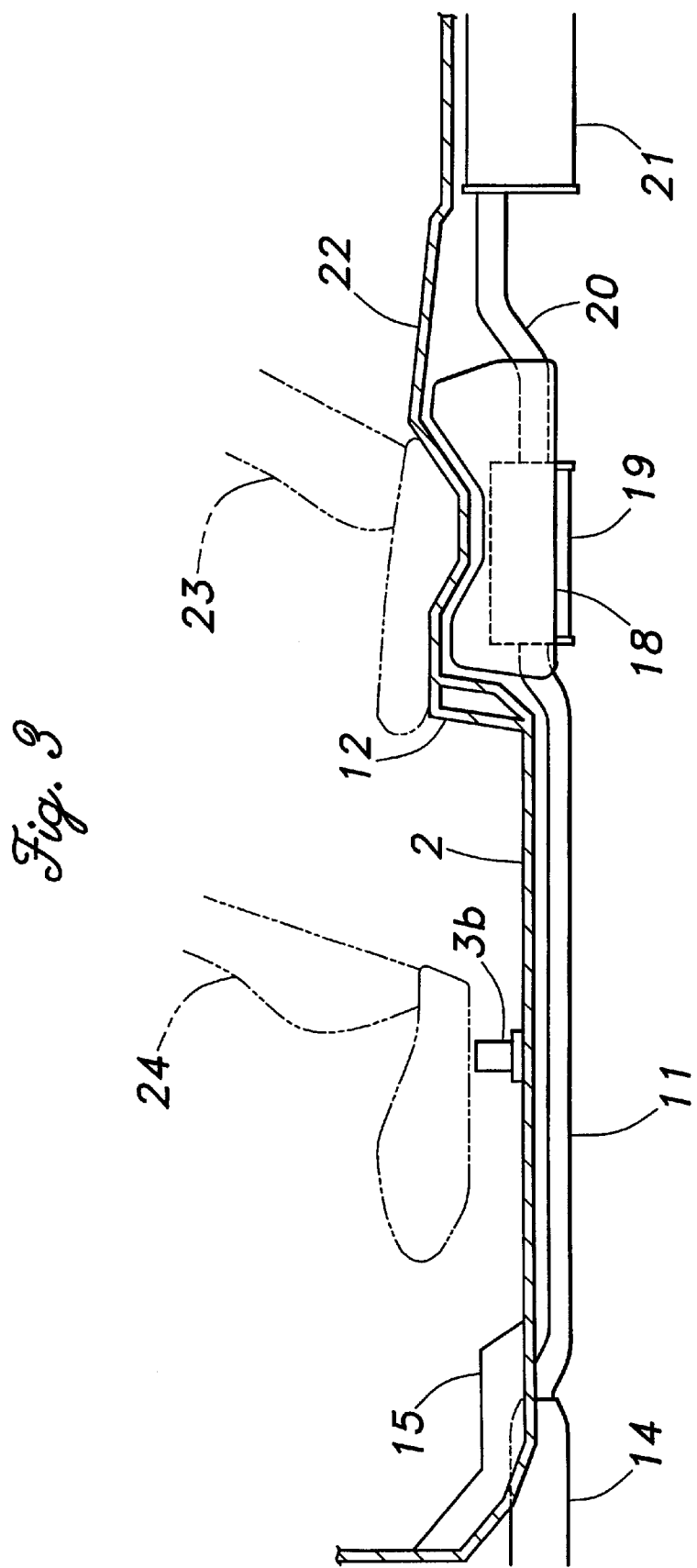

FLOOR STRUCTURE OF A VEHICLE

TECHNICAL FIELD

The present invention relates to a floor structure of a vehicle, and particularly to a floor structure of a vehicle in which a cross member is provided to connect left and right side sills.

BACKGROUND OF THE INVENTION

Vehicles of the type in which the front wheels are driven by an internal combustion engine mounted in a front portion of the vehicle body, unlike rear-drive type vehicles, do not need a propeller shaft for transmitting the drive force of the engine to the rear wheels, and therefore in such front-drive type vehicles a center tunnel is not needed for the purpose of accommodating the propeller shaft. However, it has been a common practice to adopt a structure having a center tunnel in order to ensure sufficient rigidity of the floor structure, although it is not favorable in view of improving amenity of a passenger compartment. As a structure based on such view, a floor structure is known in which a flat floor panel is used while the rigidity of the floor structure is ensured by a cross member connecting the left and right side sills. In such a floor structure, the cross member is usually provided on the under surface of the floor panel to achieve a flat floor surface. However, the cross member under the floor panel interferes with external piping such as an exhaust pipe, and to avoid the interference the piping must be vertically overlapped with the cross member. This results in a higher position of the floor, which is not preferable in view of easy getting in and out of the vehicle.

Further, in the floor structure having a center tunnel, a muffler for deadening exhaust noises which is relatively bulky in the vertical direction can be accommodated in the center tunnel, but with a flat floor panel, it has been necessary to increase the height of the floor in order to mount the muffler under the floor panel.

Thus, it has been difficult to achieve a flat floor surface and at the same time lower the position of the floor in a favorable manner.

BRIEF SUMMARY OF THE INVENTION

In view of such problems of the prior art, a primary object of the present invention is to provide a floor structure of a vehicle in which a substantially flat floor surface is achieved and at the same time the floor can be placed at a lower position.

A second object of the present invention is to provide such a floor structure of a vehicle which has sufficient rigidity.

A third object of the present invention is to provide such a floor structure in which a muffler for deadening exhaust noises can be favorably mounted without increasing the height of the floor.

According to the present invention, these and other objects can be accomplished by providing a floor structure of a vehicle, comprising: left and right side sills; a substantially flat floor panel extending between the left and right side sills; and a cross member for connecting the left and right side sills, wherein the cross member comprises: left and right upper members which extend inwardly from the left and right side sills, respectively, and attached to a top surface of the floor panel with their opposing inward ends spaced from each other; and a lower member extending laterally across a part of a lateral length of the vehicle and attached to an under surface of the floor panel.

In the above structure, the left and right upper members make projections on the top of the floor panel in its both left and right outer regions. However, by placing front seats over these projections. the floor surface can be substantially flat. This substantially flat floor surface can widen the floor space for the passengers in the back seats to rest their feet on to thereby improve the comfort of the compartment, and also, can allow the passengers to easily move between the left and right back seats. Further, because there is no projection on the floor surface between the left and right front seats, a larger space between the floor surface and the ceiling can be achieved there. This makes it possible for a passenger to walk through the space between the left and right front seats.

Although the lower member projects from the under surface of the floor panel, it only extends laterally across a part of the lateral length of the vehicle (or the distance between the left and right side sills) and therefore left and/or right open spaces beside the lower member can accommodate external piping such as an exhaust pipe. This can reduce the total height of the floor structure, and thereby allow the flat floor panel to be placed at a lower position. The exhaust pipe mounted under the floor panel preferably has a substantially elliptic cross section whose minor axis extends in a vertical direction so as to minimize its vertical dimension while maintaining a required flow area.

In view of ensuring sufficient rigidity of the floor structure, preferably at least one of the inward end portions of the left and right upper members overlap a lateral end portion of the lower member, and more preferably both of the inward end portions of the left and right upper members overlap their corresponding lateral end portions of the lower member. In this way, the upper members and the lower members can be securely attached to each other with a sufficiently large attachment area so that required rigidity of the floor structure is achieved. Due to the structure where the upper and lower cross members are separated by the floor panel interposed therebetween, the force resulting from an side impact can be favorably distributed over the floor panel.

Further, it will be advantageous if the floor structure further comprises a rear panel which is more elevated than the floor panel and extends on a rear side of the floor panel, and a muffler for deadening exhaust noises is mounted under the rear panel. In this way, the muffler can be mounted favorably without increasing the height of the floor even when the floor has no center tunnel.

BRIEF DESCRIPTION OF THE DRAWINGS

Now the present invention is described in the following with reference to the appended drawings, in which:

FIG. 2 is a plan view of the floor structure shown in FIG. 1; and

FIG. 3 is a cross-sectional view of the floor structure shown in FIG. 1 taken along the longitudinal direction.

DETAILED DESCRIPTION OF THE PREFERRED EMBODIMENTS

Figure 1:
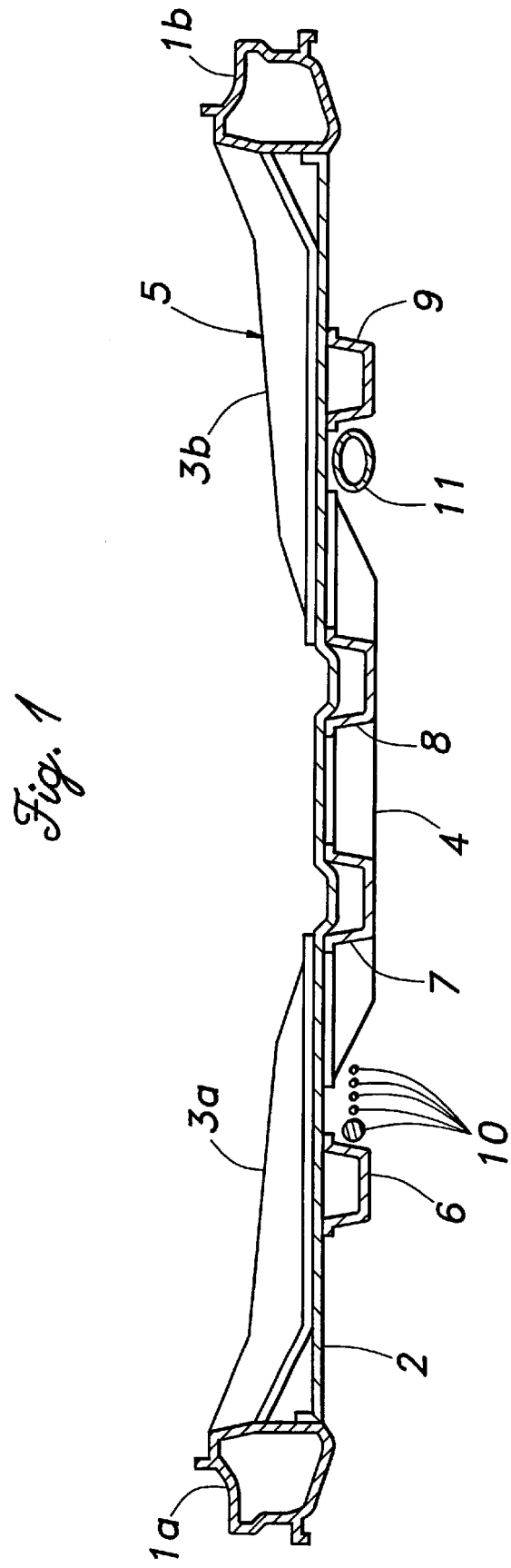
FIG. 1 is a cross sectional view of a floor structure according to the present invention taken along the lateral direction.

FIG. 1 illustrates a floor structure of a vehicle according to the present invention. This floor structure comprises: a substantially flat floor panel 2 extending between left and right side sills 1a and 1b; a cross member 5 consisting of left and right upper members 3a and 3b extending laterally and inwardly from the left and right side sills 1a and 1b, respectively, and attached to the top surface of the floor panel 2 and a lower member 4 attached to the under surface of the floor panel 2 so as to connect the mutually spaced apart and opposing inward end portions of the left and right upper members 3a and 3b; and four longitudinal members 6–9 extending along the under surface of the floor panel 2 in the longitudinal direction of the vehicle body or in the direction substantially perpendicular to the cross member 5.

The left and right ends of the floor panel 2 are respectively connected to the lowermost portions of the inwardly facing surfaces of the left and right side sills 1a and 1b, and the left and right upper members 3a and 3b extend from the corresponding upper portions of the inwardly facing surfaces of the side sills 1a and 1b in a downwardly inclined direction. These left and right upper members 3a and 3b each have a hat-shaped cross section and the under surfaces of their flange portions are attached to the top surface of the floor panel 2 by welding. Top surfaces of the left and right upper members 3a and 3b are each formed in such a fashion that they make slopes extending in a downwardly inclined direction toward the central longitudinal axis.

The lower member 4 also has a hat-shaped cross section, and the top surfaces of its flange portions are attached to the under surface of the floor panel 2 by welding. The left and right end portions of the lower member 4 overlap the inward end portions of the left and right upper members 3a and 3b so that the lower member 4 and the left and right upper members 3a and 3b are securely attached to each other with a sufficient attachment area to thereby achieve sufficient rigidity. The force applied to the side sills 1a and 1b in a side impact can be transmitted to the floor panel 2 and distributed over a wide region of the same.

The longitudinal members 6–9 each have a hat-shaped cross section, and the top surfaces of their flange portions projecting laterally are attached to the under surface of the floor panel 2 by welding. The left and right outer longitudinal members 6 and 9 are attached to the floor panel 2 at positions beneath the upper members 3a and 3b, respectively, while the left and right inner longitudinal members 7 and 8 are located such that each of them makes a cross-shape with the lower member 4. Between the lower member 4 and the left outer longitudinal member 6 are disposed external piping 10, and between the lower member 4 and the right outer longitudinal member 9 is mounted a first part of an exhaust pipe 11 which has an elliptic cross section whose minor axis extends in the vertical direction so as to minimize its vertical dimension while maintaining a required flow area. Thus, the lower member 4 projects downwardly from the under surface of the floor panel 2, but only across a part of the lateral length thereof so that the open spaces beside the lower member 4 can accommodate the external piping 10 and the exhaust pipe 11 in a favorable manner to thereby make it possible to place the floor panel 2 at a lower position.

As shown in FIG. 2, the rear end portions of the longitudinal members 6–9 are attached to a rear cross member 12 which extends laterally between the left and right side sills 1a and 1b. The front end portions of the left and right outer longitudinal members 6 and 9 both extend to a dashboard's lower part 13. The front end portion of the left inner longitudinal member 7 extends somewhat obliquely in the forward direction to avoid a concave portion 15, the under surface of which forms a concavity for accommodating a catalytic converter 14 or the like. The front end portion of the right inner longitudinal member 8 extends to a neighborhood of the rear side of the concave portion 15 and is connected to the right end portion of a lateral member 16 extending across the left inner longitudinal member 7. Further, a subsidiary beam member 17 extends from a front portion of the right outer longitudinal member 9 obliquely in the forward direction toward the concave portion 15.

The first part of the exhaust pipe 11 is bent at its connecting part to the catalytic converter 14 so that it extends obliquely in the rearward direction through a space between the subsidiary beam member 17 and the front end of the right inner longitudinal member 8. The first part of the exhaust pipe 11 further extends along the left side surface of the right outer longitudinal member 9 in the rearward direction and is connected to a primary muffler 19 which is located beside a fuel tank 18 on a rear side of the rear cross member 12. A secondary muffler 21 is connected to the primary muffler 19 via a second part of the exhaust pipe 11.

As also shown in FIG. 3, these primary and secondary mufflers 19 and 21 are mounted together with the fuel tank 18 under a rear panel 22 which is elevated than the floor panel 2 and extends between left and right rear side frames 5a and 5b on the rear side of the rear cross member 12. Back seats 23 are mounted over the rear panel 22, and a luggage room is formed in a rear side space of the back seats 23. Thus, the mufflers 19 and 21 can be mounted favorably without increasing the height of the floor even when the floor has no center tunnel.

Left and right front seats 24 are located on the floor panel 2 in a manner that they overlie the upper members 3a and 3b. In this way, the floor surface can be substantially flat. In other words, no projections are formed on top of the portions of the floor panel 2 for resting the feet of the passengers in the back seats or defined between the left and right front seats 24 through which a passenger may pass.

Thus, according to the present invention, the floor surface can be placed at a lower position and be made substantially flat so that the floor space for resting passengers' feet is widened and it becomes easier for the passengers to walk through space between the front seats. Therefore, the present invention is very effective in improving the convenience and amenity of the vehicle. In addition, because the upper and lower cross members are attached to each other via the floor panel with a sufficiently large attachment area, the rigidity of the floor structure is effectively improved. It should also be noted that due to the structure where the upper and lower cross members are separated by the floor panel, the force created resulting from a side impact can be favorably dispersed.

Although the present invention has been described in terms of preferred embodiments thereof, it is obvious to a person skilled in the art that various alterations and modifications are possible without departing from the scope of the present invention which is set forth in the appended claims.

What we claim is:

1. A floor structure of a vehicle, comprising:

left and right side sills;

a substantially flat floor panel extending between the left and right side sills; and a cross member for connecting the left and right side sills, wherein the cross member comprises left and right upper members which extend inwardly from the left and right side sills, respectively, and are attached to a top surface of the floor panel having opposing inward end portions spaced from each other, and a lower member, having end portions, extending laterally across a part of a lateral length of the vehicle and attached to an under surface of the floor panel, wherein the end portions of said lower member overlap the end portions of said left and right upper members.

2. A floor structure of a vehicle comprising:

left and right side sills;

a substantially flat floor panel extending between the left and right side sills; and a cross member for connecting the left and right side sills, wherein the cross member comprises left and right upper members which extend inwardly from the left and right side sills, respectively, and are attached to a top surface of the floor panel having opposing inward end portions spaced from each other, and a lower member extending laterally across a part of a lateral length of the vehicle and attached to an under surface of the floor panel, and wherein at least one of the inward end portions of the left and right upper members overlap a lateral end portion of the lower member.

3. A floor structure of a vehicle according to claim 2, wherein both of the inward end portions of the left and right upper members overlap their corresponding lateral end potions of the lower member.

4. A floor structure of a vehicle according to claim 1, wherein an exhaust pipe is mounted in a space defined on a lateral side of the lower member under the floor panel.

5. A floor structure of a vehicle according to claim 4, wherein the exhaust pipe has a substantially elliptic cross section whose minor axis extends in a vertical direction.

6. A floor structure of a vehicle comprising:

left and right side sills;

a substantially flat floor panel extending between the left and right side sills; and a cross member for connecting the left and right side sills, wherein the cross member comprises left and right upper members which extend inwardly from the left and right side sills, respectively, and are attached to a top surface of the floor panel with their opposing inward ends spaced from each other, and a lower member extending laterally across a part of a lateral length of the vehicle and attached to an under surface of the floor panel, and wherein the floor structure further comprises a rear panel which is more elevated than the floor panel and extends on a rear side of the floor panel, and a muffler for deadening exhaust noises is mounted under the rear panel.

* * * * *